US009690660B1

(12) United States Patent
Robins et al.

(10) Patent No.: US 9,690,660 B1
(45) Date of Patent: Jun. 27, 2017

(54) SPARE SELECTION IN A DECLUSTERED RAID SYSTEM

(71) Applicant: EMC Corporation, Hopkinton, MA (US)

(72) Inventors: Edward S. Robins, Winchester, MA (US); Evgeny Malkevich, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 103 days.

(21) Appl. No.: 14/729,714

(22) Filed: Jun. 3, 2015

(51) Int. Cl.
*G06F 11/00* (2006.01)
*G06F 11/10* (2006.01)
*G06F 17/30* (2006.01)

(52) U.S. Cl.
CPC ...... *G06F 11/1088* (2013.01); *G06F 11/1076* (2013.01); *G06F 17/3053* (2013.01)

(58) Field of Classification Search
CPC ............. G06F 11/1076; G06F 11/1088; G06F 17/3053
See application file for complete search history.

(56) References Cited

U.S. PATENT DOCUMENTS

| | | | | |
|---|---|---|---|---|
| 7,383,380 B2* | 6/2008 | Yagisawa | ............... | G06F 11/008 710/20 |
| 7,921,257 B1* | 4/2011 | Kleiman | ............. | G06F 11/1076 708/531 |
| 8,099,623 B1* | 1/2012 | Li | ........................ | G06F 11/1084 714/6.22 |
| 8,131,681 B1* | 3/2012 | Hangud | .............. | G06F 11/1461 707/654 |
| 8,195,978 B2* | 6/2012 | Flynn | .................. | G06F 11/1008 714/6.1 |
| 8,261,016 B1* | 9/2012 | Goel | ................... | G06F 11/1088 711/110 |
| 8,453,036 B1* | 5/2013 | Goel | ................... | G06F 11/1096 714/763 |
| 8,880,801 B1 | 11/2014 | Robins et al. | | |
| 9,043,555 B1* | 5/2015 | Khona | .................. | G06F 3/0683 711/118 |
| 2006/0112222 A1* | 5/2006 | Barrall | .................. | G06F 3/0607 711/114 |
| 2011/0264949 A1* | 10/2011 | Ikeuchi | ............... | G06F 11/1076 714/6.22 |
| 2012/0030425 A1* | 2/2012 | Becker-Szendy | ... | G06F 11/1076 711/114 |
| 2013/0290775 A1* | 10/2013 | Tucek | ................. | G06F 11/0727 714/6.22 |

(Continued)

OTHER PUBLICATIONS

Kevin E. Granlund, et al., "RAID Failure Prevention," U.S. Appl. No. 13/886,763, filed May 3, 2013.

(Continued)

*Primary Examiner* — Joshua P Lottich
(74) *Attorney, Agent, or Firm* — BainwoodHuang

(57) ABSTRACT

Embodiments are directed to techniques for techniques for selecting a proper set of spare sections to use in a given failure scenario. These embodiments use a set of rules to define which spare sections are eligible to serve as spares for reconstruction of the RAID members on a disk that had failed. In addition, the set of rules may include weighted rules to allow optimization in the spare selection process.

18 Claims, 6 Drawing Sheets

(56) References Cited

U.S. PATENT DOCUMENTS

| | | | |
|---|---|---|---|
| 2015/0121169 A1* | 4/2015 | Iliadis | G06F 11/1076 |
| | | | 714/766 |
| 2015/0199129 A1* | 7/2015 | Nair | G06F 3/064 |
| | | | 711/114 |
| 2015/0269023 A1* | 9/2015 | Taranta, II | G06F 11/1076 |
| | | | 714/766 |
| 2016/0050146 A1* | 2/2016 | Henderson | H04L 67/1097 |
| | | | 370/392 |
| 2016/0239397 A1* | 8/2016 | Thomas | G06F 11/2094 |

OTHER PUBLICATIONS

Kevin E. Granlund, et al., "Allocating RAID Storage Volumes Across a Distributed Network of Storage Elements," U.S. Appl. No. 14/231,282, filed Mar. 31, 2014.

Edward S. Robins, et al., "Optimizing Spare Capacity and Spare Distribution," U.S. Appl. No. 14/587,371, filed Dec. 31, 2014.

Ward Edwards, "Smarts and Smarter: Improved Simple Methods for Multiattribute Utility Measurement," Organizational Behavior and Human Decision Processes, 1994, pp. 306-325, vol. 60, Issue 3, Academic Press, Inc.

Mari Poyhonen, "On the convergence of multiattribute weighting methods," Helsinki University of Technology, Systems Analysis Laboratory, Research Reports, A66, Apr. 1997, 16 pages.

"Drive Sparing in EMC® Symmetrix® VMAX® Family Systems: Applied Technology," Sep. 2012, downloaded from <https://web.archive.org/web/20131102063746/http://www.emc.com/collateral/hardware/white-papers/h6541-drive-sparing-symmetrix-vmax-wp.pdf>,18 pages.

* cited by examiner

Fig. 2

| 42(a) Disk a | 42(b) Disk b | 42(c) Disk c | 42(d) Disk d |
|---|---|---|---|
| 44(a)(1) RG 1 | 44(b)(1) RG 1 | 44(c)(1) RG 1 | 44(d)(1) RG 1 |
| 44(a)(2) RG 5 | 44(b)(2) RG 6 | 44(c)(2) RG 12 | 44(d)(2) RG 11 |
| 44(a)(3) Spare Split 1 | 44(b)(3) RG 9 | 44(c)(3) RG 7 | 44(d)(3) Spare Split 4 |
| 44(a)(4) Spare Split 2 | 44(b)(4) Spare Split 3 | 44(c)(4) RG 10 | 44(d)(4) RG 8 |

| 42(e) Disk e | 42(f) Disk f | 42(g) Disk g | 42(h) Disk h |
|---|---|---|---|
| 44(e)(1) RG 11 | 44(f)(1) RG 5 | 44(g)(1) RG 6 | 44(h)(1) Spare Split 8 |
| 44(e)(2) RG 2 | 44(f)(2) RG 2 | 44(g)(2) RG 2 | 44(h)(2) RG 2 |
| 44(e)(3) RG 9 | 44(f)(3) RG 12 | 44(g)(3) Spare Split 6 | 44(h)(3) RG 7 |
| 44(e)(4) RG 8 | 44(f)(4) Spare Split 5 | 44(g)(4) Spare Split 7 | 44(h)(4) RG 10 |

| 42(i) Disk i | 42(j) Disk j | 42(k) Disk k | 42(l) Disk l |
|---|---|---|---|
| 44(i)(1) Reserved/Spare Split 9 | 44(j)(1) Spare Split 11 | 44(k)(1) RG 5 | 44(l)(1) RG 12 |
| 44(i)(2) Spare Split 10 | 44(j)(2) RG 10 | 44(k)(2) RG 11 | 44(l)(2) RG 6 |
| 44(i)(3) RG 3 | 44(j)(3) RG 3 | 44(k)(3) RG 3 | 44(l)(3) RG 3 |
| 44(i)(4) RG 7 | 44(j)(4) RG 8 | 44(k)(4) RG 9 | 44(l)(4) Spare Split 12 |

| 42(m) Disk m | 42(n) Disk n | 42(o) Disk o | 42(p) Disk p |
|---|---|---|---|
| 44(m)(1) RG12 | 44(n)(1) Spare Split 13 | 44(o)(1) Spare Split 14 | 44(p)(1) RG 5 |
| 44(m)(2) RG 6 | 44(n)(2) RG 11 | 44(o)(2) Spare Split 15 | 44(p)(2) Spare Split 16 |
| 44(m)(3) RG 10 | 44(n)(3) RG 7 | 44(o)(3) RG 8 | 44(p)(3) RG 9 |
| 44(m)(4) RG 4 | 44(n)(4) RG 4 | 44(o)(4) RG 4 | 44(p)(4) RG 4 |

46(1)  46(2)  46(3)  46(4)

43

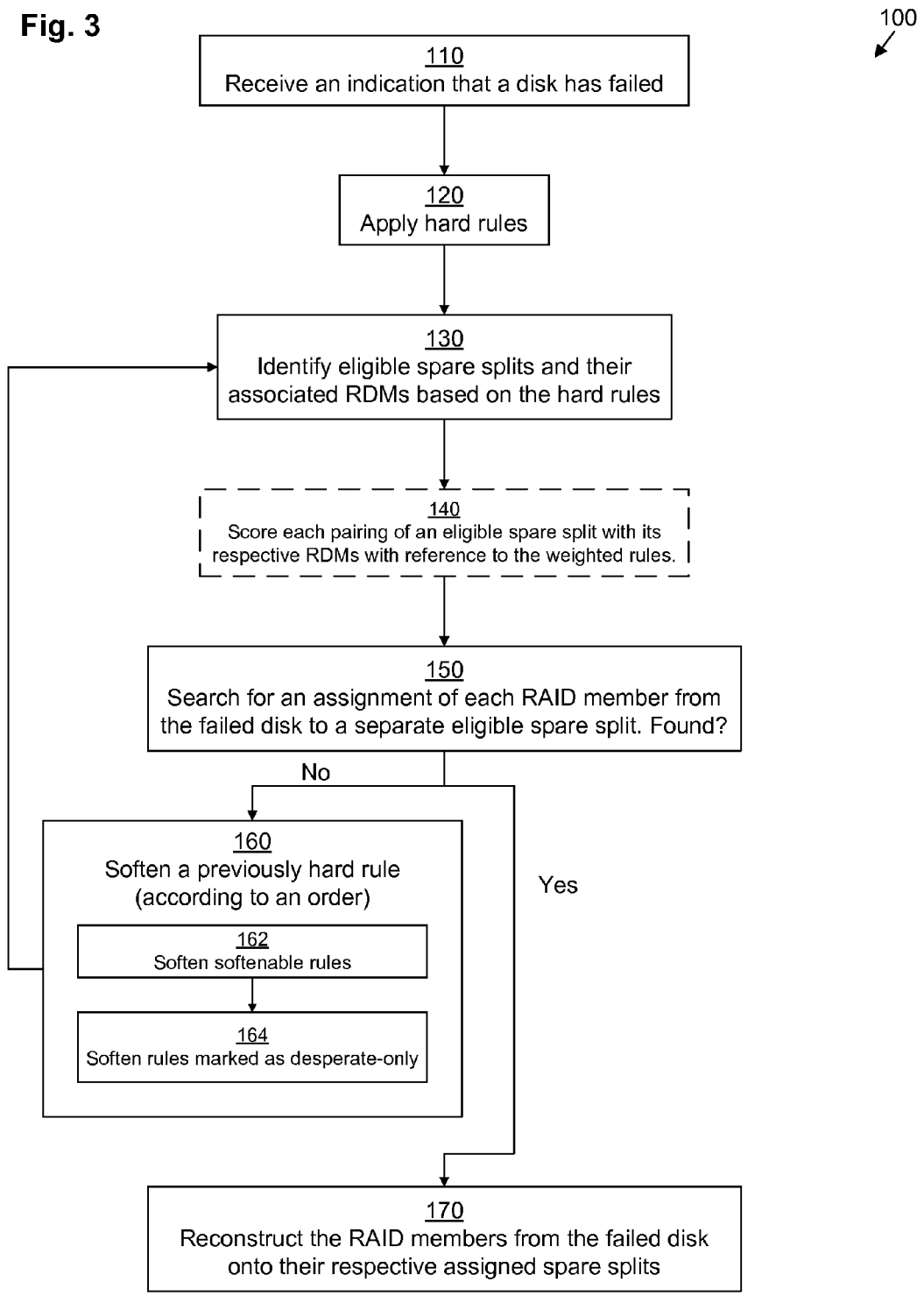

SPARE SELECTION IN A DECLUSTERED RAID SYSTEM

BACKGROUND

Data storage systems are often used to store large quantities of data with fast access times. Redundant Array of Independent Disk (RAID) technology is often used to provide increased data availability and reliability by storing redundant information (e.g., parity) across a set of disks within a RAID group.

In some architectures, declustered RAID is used to reduce the rebuild time in case of a failure. In such systems, a cluster of disks can store several RAID groups dispersed across the cluster. This approach provides speed and flexibility in the event of a disk failure, especially when a level of RAID involving parity (for example, RAID 5 with one parity member or RAID 6 with two parity members) is used, since reconstruction of the data from the different RAID groups stored on the failed disk typically involves reading from a diverse set of disks associated with each RAID group. There is also flexibility because entire spare drives need not be kept, but rather only spare sections of disks, and the data from the different RAID groups stored on the failed disk may be reconstructed onto several different spare areas.

SUMMARY

Unfortunately, the above-described conventional systems suffer from deficiencies. Although declustered RAID allows spare sections to be dispersed around a RAID cluster and for multiple such spare sections to be used for reconstructing the data from a failed drive, selecting which spare sections to use in any given failure scenario may be difficult, possibly resulting in an inefficiency.

Thus, it would be desirable to provide techniques for selecting a proper set of spare sections to use in a given failure scenario. It would further be desirable for such techniques to yield optimized results. These results may be accomplished by using a set of rules to define which spare sections are eligible to serve as spares for reconstruction of the RAID members on a disk that had failed. In addition, the set of rules may include weighted rules to allow optimization in the spare selection process.

In one embodiment, a method is performed by a data storage device, of recovering from a failure of a disk within a declustered RAID arrangement, the declustered RAID arrangement including N disks, each disk having a plurality of splits, the declustered RAID arrangement having a plurality of RAID groups, each RAID group distributed over a plurality less than N of members on distinct splits on distinct disks of the N disks, N being an integer greater than one. The method includes (a) receiving an indication that the disk has failed, the failed disk storing a set of members of various RAID groups of the plurality of RAID groups, (b) identifying, with reference to a set of hard rules, a set of spare splits eligible to store reconstructed versions of the set of members, each spare split being a split which is currently not a member of any RAID group, resulting in a set of eligible members of the set of members being identified as eligible sources for each respective spare split of the set of spare splits, (c) searching for an assignment between each member of the set of members and a respective eligible spare split of the set of spare splits, and (d) upon finding an assignment, reconstructing each member of the various RAID groups stored on the failed disk onto its respective assigned spare split. An apparatus and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

FIG. 2 is a block diagram depicting an example layout of a dispersal of RAID groups and spare split sections across a RAID cluster for use in connection with various embodiments.

FIG. 3 is a flowchart depicting an example method according to various embodiments.

DETAILED DESCRIPTION

Embodiments are directed to techniques for selecting a proper set of spare sections to use in a given failure scenario. These embodiments use a set of rules to define which spare sections are eligible to serve as spares for reconstruction of the RAID members on a disk that had failed. In addition, the set of rules may include weighted rules to allow optimization in the spare selection process.

Figure 1:
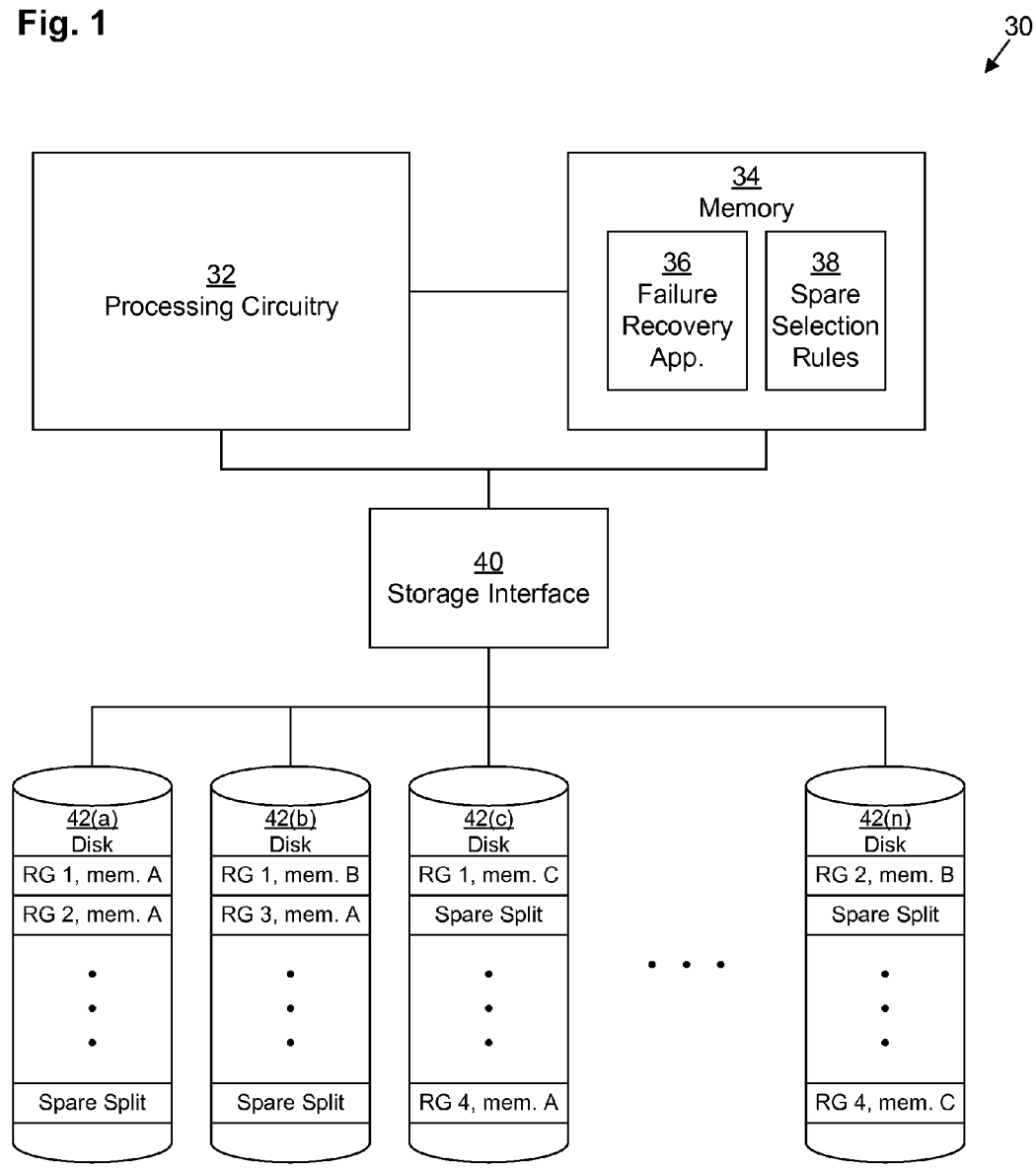
FIG. 1 is a block diagram depicting an example system or apparatus for use in connection with various embodiments.

FIG. 1 depicts a data storage system (DSS) 30. DSS 30 may be, for example, a VMAX® series enterprise data storage system or a VNX® series data storage system provided by the EMC Corporation of Hopkinton, Mass. DSS 30 is typically housed in one or more storage cabinets (not depicted). However, in some embodiments, DSS 30 may be a dispersed system operating across a network.

DSS 30 includes processing circuitry 32 interconnected with memory 34 and storage interface circuitry 40 configured to provide access to a set of disks 42 (depicted as disks 42(*a*), 42(*b*), 42(*c*), . . . , 42(*n*)). Processing circuitry 32 may be any kind of processor or set of processors configured to perform operations, such as, for example, a microprocessor, a multi-core microprocessor, a digital signal processor, a system on a chip, a collection of electronic circuits, a similar kind of controller, or any combination of the above. In some embodiments (not depicted), DSS 30 also includes network interface circuitry for connecting to a network (e.g., a storage area network) and user interface circuitry for interfacing with a user.

Memory 34 may be any kind of digital system memory, such as, for example, random access memory (RAM). Memory 34 stores an operating system in operation (not depicted, e.g., Linux, UNIX, Windows, or a similar operating system), various storage system management programs in operation (not depicted), and one or more applications executing on processing circuitry 32 as well as data used by those applications. Memory 34 may also store a storage stack, which is configured to process data storage operations directed at the disks 42 of the DSS 30. Memory 34 also stores a failure recovery application 36 and a set of spare selection rules 38.

Disks 42 may be any kind of persistent storage drives, such as, for example, magnetic hard disk drives and flash-based solid state disk drives. There may be any number of disks 42 in DSS 30. In an example system, there may be between forty-eight and 3,200 disks 34. Each disk 42 is divided into a number of splits. Some of these splits are used to store members of RAID groups. For example, as depicted, RAID group RG 1 has member A stored on a split of disk 42(a), member B stored on a split of disk 42(b), and member C stored on a split of disk 42(c). Similarly, RAID group RG 2 has member A stored on a split of disk 42(a) and a member B stored on a split of disk 42(n). Some of the splits stored on the disks are spare splits, which may be used to store reconstructed versions of RAID members from failed disks 42.

FIG. 2 depicts an example RAID cluster 43 of disks 42 in further detail. There may be one or more RAID clusters 43 per DSS 30. In some embodiments, a RAID cluster 43 may even extend off of DSS 30.

As depicted, RAID cluster 43 includes 16 disks 42(a), . . . , 42(p) and stores twelve RAID groups, each RAID group having four members (R=4). Each disk 42 is configured to store four splits 44 (Q=4). The four splits 44 of disk 42(a) are splits 44(a)(1), 44(a)(2), 44(a)(3), and 44(a)(4). Split 44(a)(1) stores a member of RAID group RG 1 and split 44(a)(2) stores a member of RAID group RG 5, while splits 44(a)(3) and 44(a)(4) are spare splits.

As depicted, RAID group RG 1 is distributed across disks 42(a), 42(b), 42(c), and 42(d). Similarly, RAID group RG 11 is distributed across disks 42(d), 42(e), 42(k), and 42(n). The remaining RAID groups are similarly dispersed across respective sets of four disks 42 of the RAID cluster 43 as depicted in FIG. 2. Generally, each RAID group is dispersed across a different set of disks 42.

RAID cluster 43 includes sixteen spare splits, numbered 1 through 16. However, in one example, split 44(i)(1) may initially be reserved space not allocated for use as a spare split unless it becomes necessary to do so.

As depicted, RAID cluster 43 may be divided into four power zones 46 (depicted as power zones 46(1), 46(2), 46(3), 46(4)). Each power zone 46 may share one or more power supplies and power transmission equipment. Typically, if there is a power problem (e.g., a power surge or a power failure), only the disks in a single power zone 46 will be affected. Thus, the RAID groups are usually distributed such that there is no more than one member of each RAID group in a single power zone 46, so that if there is a power problem, sufficient members of each RAID group will remain for data recovery. In general, a RAID group contains K+r disks, in which r represents a degree of recovery. Thus, for RAID 5, r is equal to 1, while for RAID 6, r is equal to 2. It is possible to have up to r members of any RAID group within any power zone 46 in order to be able to maintain the ability to recover from a power zone 46 failure.

FIG. 3 illustrates an example method 100 performed by DSS 30 for recovering from a failure of a disk 42 within a RAID cluster 43. It should be understood that any time a piece of software (e.g., failure recovery application 36) is described as performing a method, process, step, or function, in actuality what is meant is that a computing device or distributed computing system (e.g., DSS 30) on which that piece of software is running performs the method, process, step, or function when executing that piece of software on its processing circuitry 32.

It should be understood that, within FIG. 3, step 140 is dashed because it may be optional and not fundamental to method 100. However, it should be understood that, in some embodiments, one or more of the other steps or sub-steps may also be omitted. Similarly, in some embodiments, one or more steps or sub-steps may be combined together or performed in a different order.

In step 110, failure recovery application 36 receives an indication that a disk 42 (e.g., disk 42(a)) has failed. In step 120, failure recovery application 36 applies hard rules from the set of spare selection rules 38. The set of spare selection rules 38 includes both unweighted rules and weighted rules. See Table 1 for an example set of rules, which may be used in conjunction with the example of FIG. 2.

TABLE 1

| Rule | Soften? | Allow if desp.? | Weight | Function/ value | Softening Hierarchy Group | Range | Limit |
|---|---|---|---|---|---|---|---|
| Leave empty | Yes | Yes | None | T/F | 5 | N/A | N/A |
| # Splits per drive fixed | No | No | None | T/F | N/A | 0 . . . 4 | 4 |
| Short stroking | Yes | Yes | 1 | ~Mahal. distance | 3 | 0 . . . 3 | 2 |
| Max read Spread | Yes | Yes | 0.5 | Utility Func. | 1 | 3 . . . 12 | 8 |
| Max read Collision | Yes | Yes | 0.5 | Utility Func. | 1 | 0 . . . 4 | 1 |
| Min write spread | Yes | Yes | 0.2 | Utility Func. | 2 | 1 . . . 4 | 2 |
| RG members per disk | No | Yes | 1 | T/F | N/A | 1 . . . 4 | 1 |
| RG members per power zone | Yes | Yes | 0.1 | Utility Func. | 4 | 1 . . . 4 | 1 |

The "leave empty" rule is an unweighted rule that prohibits reserved areas not currently allocated for spare use to be used as spare splits. The rule is softenable, but it has a softening hierarchy group number of 5, which means that it is only softened after rules with lower numbers.

The "# Splits per drive fixed" rule is an unweighted rule that defines the maximum number of splits allowed per disk, which, in the example of FIG. 2 is four. The rule is not softenable and it may not be violated even in a desperate situation.

The "short stroking" rule is a weighted rule that has a value that varies with the Mahalanobis distance between the disk position of the spare split and the original RAID member. Thus, in the example, since there are at most Q=4 splits per disk, the Mahalanobis distance can vary between 0 and 3. When the rule is hard, Mahalanobis distances greater than 2 are not permitted, although the rule is softenable, with an intermediate softening hierarchy group number of 3. The value of the rule may be defined for example as 1/(Mahalanobis distance+1). This rule ensures that, when practical, the disk position of the spare split and the original RAID member are similar so that seek times are not too dissimilar. The rule has a weight of 1 meaning that it gets weighted heavily.

The "Max Read Spread" rule is a weighted rule that varies according to a function intended to optimize both reliability and speed. The read spread is the number of disks 42 that the failure recovery application 36 must read from in order to recover from the failure of a disk 42. Thus, in the example of FIG. 2, since there may be up to four RAID members per disk 42 and recovery of each requires reading from the remaining three RAID members of its respective RAID group, the failure recovery application 36 may need to read from up to 4×3=12 disks 42. Although reading from that many disks 42 increases recovery speed, it can also decrease reliability because if any of those twelve disks 42 also fails, there will be data loss. Thus, the rule defines a maximum read spread of 8, for example. However, the rule is softenable, with a softening hierarchy group number of 1, which means that it is one of the first rules to be softened. The rule has a weight of 0.5 meaning that it gets weighted at an intermediate level.

The "Max Read Collision" rule is a weighted rule that varies according to a function intended to optimize both reliability and speed. The read collision is the number of situations in which the failure recovery application 36 must read from the same disk 42 to recover two different RAID members from the failed disk 42. It can vary up to the number of RAID members Q=4 per disk 42. Although read collisions mean a decrease in read spread (see above), improving reliability, they also lead to a decrease in recovery speed. Thus, the rule defines a maximum read collision of 1, for example. However, the rule is softenable, with a softening hierarchy group number of 1, which means that it is one of the first rules to be softened. The rule has a weight of 0.5 meaning that it gets weighted at an intermediate level.

The "Min Write Spread" rule is a weighted rule that varies according to a function intended to optimize both reliability and speed. The write spread is the number of disks 42 that the failure recovery application 36 must write to in order to recover from the failure of a disk 42. Thus, in the example of FIG. 2, since there may be up to four RAID members per disk 42, the write spread can vary from one to four. The lower the write spread, the slower the speed due to write collisions, so the minimum is set to be two. However, the rule is softenable, with an intermediate softening hierarchy group number of 2. The rule has a weight of 0.2 meaning that it gets a low weight.

The "RG members per disk" rule is a weighted rule that evaluates to TRUE if the number of RAID group members per disk on a given spare split is one and FALSE if the number of RAID group members per disk on a given spare split is more than one. This rule is not softenable because reliability is compromised if multiple RAID members are stored on the same disk. However, it may be violated in a desperate situation to prevent data loss.

The "RG members per power zone" rule is a weighted rule that varies based on the number of members of the same RAID group that end up in the same power zone 46 if a RAID member is stored on a particular spare split. To prevent data loss, this number should not exceed the redundancy r of the RAID group, which, in the case of RAID 5 is one. However, the rule is softenable, with a high softening hierarchy group number of 4.

Thus, in step 120, the unsoftened versions of these rules would be applied.

In step 130, failure recovery application 36 identifies spare splits and their associated RAID data members (RDMs) based on the rules. An RDM is a RAID member on the failed disk 42 that may be assigned to a particular spare split in accordance with the rules. This step takes the unweighted rules into account as well as the limits from the weighted rules. Initially only the hard versions of the rules are applied, but upon softening, some rules or limits may be ignored. Certain spare splits may be found to be eligible to receive at least one RAID member from the failed disk, while other spare splits may be found to be ineligible to receive any.

In optional step 140, failure recovery application 36 scores each eligible spare split for each of its RDMs with reference to the weighted rules. Thus, for example, the sum of the function value for each weighted rule is multiplied by its weight and then all these amounts are summed together.

In step 150 failure recovery application 36 searches for an assignment of each RAID member from the failed disk 42 to a respective spare split from the eligible spare splits identified in step 130. In embodiments in which scores are calculated in step 140, failure recovery application 36 uses the scores to find a preferred assignment, if possible.

In some embodiments, failure recovery application 36 applies a search technique to look for a complete assignment of RAID members to eligible spare splits having a highest total score. Any known search technique may be used, but certain example techniques are presented.

Figure 4:
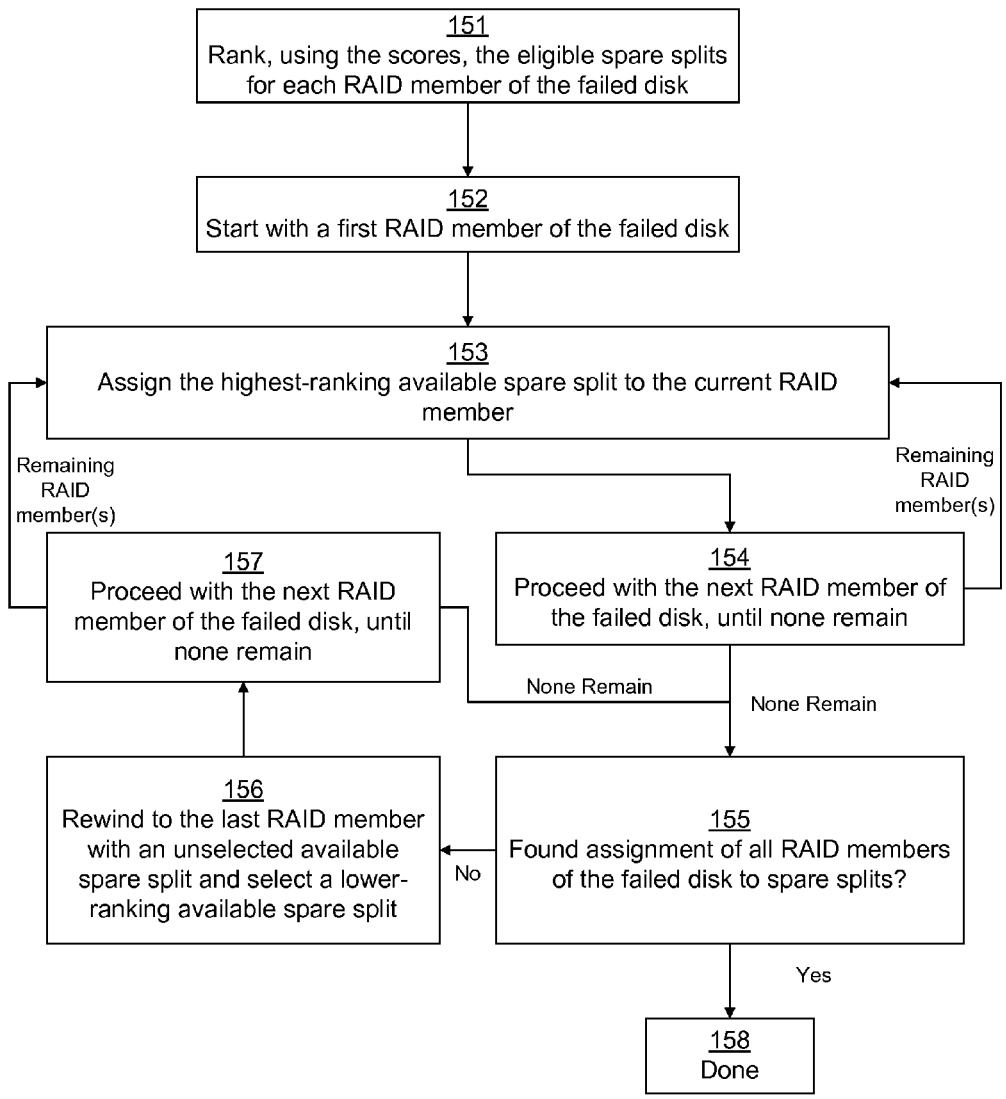
FIG. 4 is a flowchart depicting further detail with respect to an example method according to various embodiments.

For example, in one embodiment, step 150 may be performed as depicted in flowchart 150-A in FIG. 4. In this embodiment, the eligible spare splits for each RAID member of the failed disk 42 are ranked from highest to lowest pairwise score (step 151), and then the RAID members are iterated over, choosing the highest-ranking spare split that has not yet been assigned to another RAID member or otherwise been eliminated (steps 152-157). If this results in a complete assignment of spare splits to all RAID members, then that assignment is used (steps 155 and 158). Otherwise, the assignment is partially rewound to go back to the last RAID member for which a lower-ranking spare split was available to be selected, and operation continues from there. If this does not yield a complete assignment, then, the assignment is rewound further back until all eligible assignments have been tried.

In more detail, in step 151, failure recovery application 36 ranks the eligible spare splits for each RAID member of the failed disk 42. Thus, for example, if the failed disk 42 is disk 42($a$), then failure recovery application 36 iterates over the member of RAID group RG 1 stored on split 44($a$)(1) and the member of RAID group RG 5 stored on split 44($a$)(2). Assuming that the only rules used are "# Splits per drive fixed," "Short stroking," "RG members per disk," and "RG members per power zone," the set of eligible spare splits for both members would be {44($i$)(1), 44($i$)(2)}. Thus, for the member of RAID group RG 1 stored on split 44($a$)(1), failure recovery application 36 would calculate respective scores for spare splits 44($i$)(1) and 44($i$)(2), while for the member of RAID group RG 5 stored on split 44($a$)(2), failure recovery application 36 would also calculate respective scores for spare splits 44($i$)(1) and 44($i$)(2).

For the member of RAID group RG 1 stored on split 44($a$)(1), the score for spare split 44($i$)(1) would have been calculated (in step 140) as follows. The "Short stroking" rule evaluates to $1/(0+1)=1$ because the Mahalanobis distance is zero, since 44($a$)(1) and 44($i$)(1) are both in position 1 on their respective drives. The "RG members per disk" rule evaluates to TRUE=1 because there would only be one RAID group member per disk. The "RG members per power zone" rule evaluates to 1 because there would still only be one RAID group member per power zone 46. Thus, the total score evaluates to 1×1+1×1+0.1×1=2.1.

For the member of RAID group RG 1 stored on split 44(*a*)(1), the score for spare split 44(*i*)(2) would have been calculated (in step 140) as follows. The "Short stroking" rule evaluates to 1/(1+1)=0.5 because the Mahalanobis distance is one, since 44(*a*)(1) and 44(*i*)(2) are separated by one position on their respective drives. The "RG members per disk" rule evaluates to TRUE=1 because there would only be one RAID group member per disk. The "RG members per power zone" rule evaluates to 1 because there would still only be one RAID group member per power zone 46. Thus, the total score evaluates to 1×0.5+1×1+0.1×1=1.6.

Thus, in step 151, for the member of RAID group RG 1 stored on split 44(*a*)(1), failure recovery application 36 ranks spare split 44(*i*)(1) first and spare split 44(*i*)(2) second, since spare split 44(*i*)(1) has a higher score.

For the member of RAID group RG 5 stored on split 44(*a*)(2), the score for spare split 44(*i*)(1) would have been calculated (in step 140) as follows. The "Short stroking" rule evaluates to 1/(1+1)=0.5 because the Mahalanobis distance is one, since 44(*a*)(2) and 44(*i*)(1) are separated by one position on their respective drives. The "RG members per disk" rule evaluates to TRUE=1 because there would only be one RAID group member per disk. The "RG members per power zone" rule evaluates to 1 because there would still only be one RAID group member per power zone 46. Thus, the total score evaluates to 1×0.5+1×1+0.1×1=1.6.

For the member of RAID group RG 5 stored on split 44(*a*)(2), the score for spare split 44(*i*)(2) would have been calculated (in step 140) as follows. The "Short stroking" rule evaluates to 1/(0+1)=1 because the Mahalanobis distance is zero, since 44(*a*)(2) and 44(*i*)(2) are both in position 2 on their respective drives. The "RG members per disk" rule evaluates to TRUE=1 because there would only be one RAID group member per disk. The "RG members per power zone" rule evaluates to 1 because there would still only be one RAID group member per power zone 46. Thus, the total score evaluates to 1×1+1×1+0.1×1=2.1.

Thus, in step 151, for the member of RAID group RG 5 stored on split 44(*a*)(2), failure recovery application 36 ranks spare split 44(*i*)(2) first and spare split 44(*i*)(1) second, since spare split 44(*i*)(2) has a higher score.

After the ranking of step 151, operation proceeds with step 152. In step 152, failure recovery application 36 begins with a first RAID member of the failed disk 42(*a*) as the current RAID group member. Thus, for example, failure recovery application 36 might begin with the member of RAID group RG 1 stored on split 44(*a*)(1). Then, in step 153, failure recovery application 36 assigns the highest-ranking available spare split to the current RAID group member. Since spare split 44(*i*)(1) is ranked highest for the member of RAID group RG 1 stored on split 44(*a*)(1), failure recovery application 36 assigns spare split 44(*i*)(1) to the member of RAID group RG 1 initially stored on split 44(*a*)(1).

Then, in step 154, failure recovery application 36 proceeds with the next RAID member of the failed disk 42(*a*) as the new current RAID group member until none remain, returning back to step 153. Thus, in the example above, after assigning spare split 44(*i*)(1) to the member of RAID group RG 1 initially stored on split 44(*a*)(1), failure recovery application 36 assigns spare split 44(*i*)(2) to the member of RAID group RG 5 initially stored on split 44(*a*)(2), since spare split 44(*i*)(2) is ranked highest for the member of RAID group RG 5 stored on split 44(*a*)(2).

Then, in step 155, failure recovery application 36 determines whether or not it has found an assignment for every RAID member on the failed disk 42(*a*), and, if so, operation proceeds with step 158, terminating flowchart 150-A and returning back to method 100. Otherwise, failure recovery application 36 proceeds with step 156, rewinding to the last RAID member with an unselected available spare split to select a lower-ranking available spare split. Then operation proceeds with the next RAID member (step 157), returning to steps 153-155 again. If no assignment is found yet again in step 155, step 156 is repeated until eventually all combinations of valid assignments have been tried.

In some embodiments, instead of iterating through the RAID members of the failed disk 42, failure recovery application 36 may instead iterate through the spare splits.

It should be understood that, although the technique of flowchart 150-A has been described in terms of iteration, it can also be described or implemented using recursion. In particular, failure recovery application 36 may call a recursive search algorithm for a first RAID member of the failed disk 42(*a*). This recursive algorithm iterates over the eligible spare splits, from highest to lowest ranks, recursively calling the recursive function for a next RAID member of the failed disk 42(*a*) with a constraint that the first RAID member of the failed disk 42(*a*) is assigned to a particular spare split. The recursive function operating on the second RAID member of the failed disk 42(*a*) iterates over the eligible spare splits for that RAID member, excluding spare splits from the received constraints, recursively calling the recursive function for a next RAID member of the failed disk 42(*a*) with the original constraint plus a new constraint for the assignment of the second RAID member. This continues on, recursively, until a solution is found.

Figure 5:
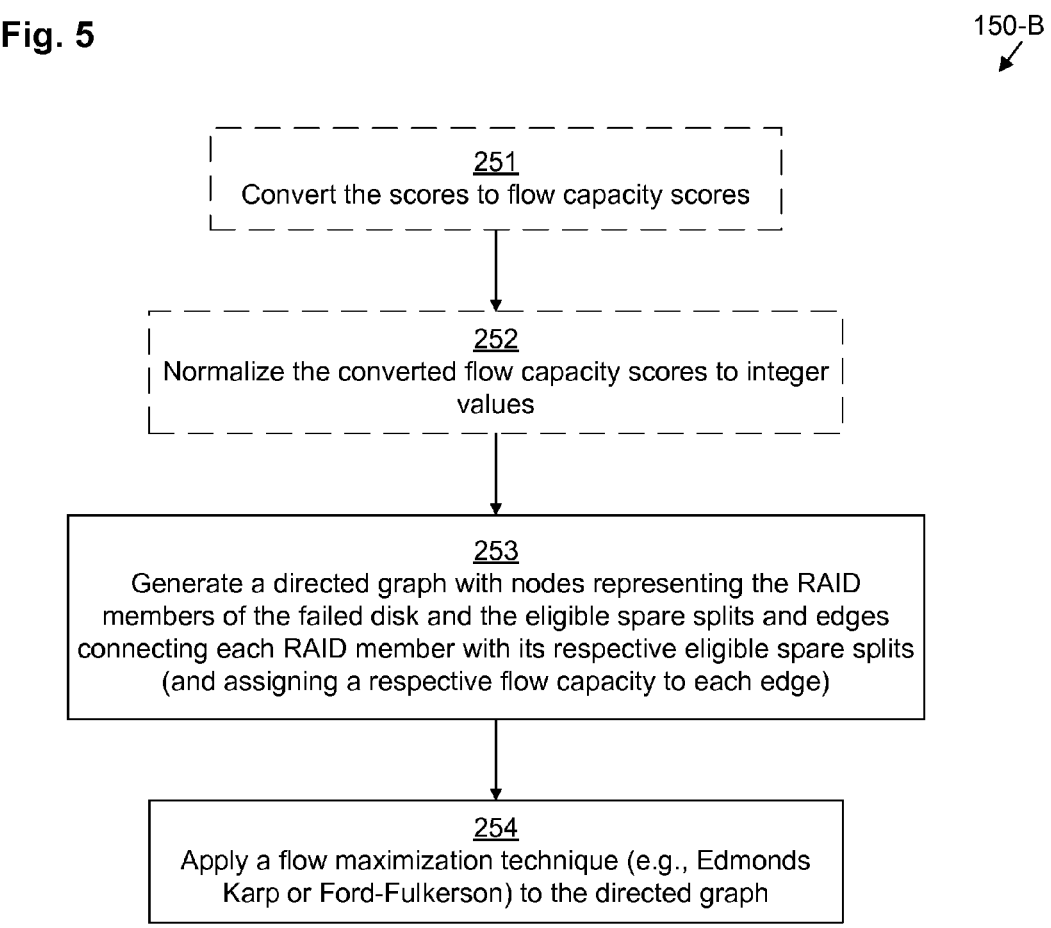
FIG. 5 is a flowchart depicting further detail with respect to an example method according to various embodiments.

In other embodiments, step 150 may be performed as depicted in flowchart 150-B in FIG. 5. It should be understood that, within FIG. 5, steps 251 and 252 are dashed because they may be optional and not fundamental to 150-B. However, it should be understood that, in some embodiments, one or more of the other steps or sub-steps may also be omitted. Similarly, in some embodiments, one or more steps or sub-steps may be combined together or performed in a different order.

In the embodiments of flowchart 150-B, in optional step 251, failure recovery application 36 converts the scores to flow capacity scores. This may be done, for example, by inverting each score or subtracting each score from a maximal value.

Then, in optional step 252, which may be performed to increase performance, these converted flow capacity scores may be normalized to the lowest flow capacity score and rounded to the closest integer.

Then, in step 253, failure recovery application 36 generates a directed graph 300 (see FIG. 6) from start node 302 to end node 304 with intermediate RAID member nodes 306 and eligible spare split nodes 308. Each RAID member node 306 represents a RAID member from the failed disk 42, while each eligible spare split node 308 represents an eligible spare split identified in step 130 (see FIG. 3). Failure recovery application 36 also creates edges from the RAID member nodes 306 to the eligible spare split nodes 308. In embodiments in which flow capacity values were calculated in optional steps 252-253, these flow capacity values are used for these edges. Otherwise, each edge may be given an equal flow capacity value.

Then, in step 254, a flow maximization technique is used to find an optimal path through the graph, resulting in an assignment, if one is possible. The Ford-Fulkerson technique is a complex technique that does not require the normalization of step 253, but it may utilize irrational numbers, and it may be computationally expensive. The Edmonds-Karp technique may be used instead in connection with step 253, being less computationally expensive.

Returning to FIG. 3, it should be understood, that, in some embodiments, the choice of which search technique to use (e.g., 150-A, Ford-Fulkerson, Edmonds-Karp, or non-weighted 150-B) may be selected dynamically depending on the available computational resources and time. In some embodiments, if one search technique does not yield a solution, step 150 may be repeated using a different search technique until a solution is found.

If a solution is found, operation proceeds with step 170, in which failure recovery application 36 reconstructs the RAID members from the failed disk 42 onto their respective assigned spare splits. This may be done according to known techniques. For example, in the case of RAID 5, the remaining RAID members of each RAID group may be read to reconstruct the member of that RAID group that was previously on the failed disk 42 (e.g., by XORing together the data from the remaining RAID members of that RAID group). It may not be possible to find a complete assignment with the hard rules, however. In that case, operation proceeds with step 160.

In step 160, at least one hard rule is softened. This may be done in various ways. In some embodiments, all hard rules are softened at once, while in other embodiments, a softening hierarchy is used. Thus, rules having a softening hierarchy group value of 1 are softened first, and rules having higher softening hierarchy group values are only softened later, if necessary. Sub-step 162 indicates that softenable rules are softened first (in hierarchical order), and subsequent sub-step 164 indicates that rules marked as desperate are only softened once all the softenable rules have been softened without a valid assignment found. Once a rule has been softened, operation returns back to step 130 so that the set of eligible spare splits can be re-evaluated (and re-scored), allowing a new search to occur. Operation continues looping through step 160 until a complete assignment is found or all softenable and desperate rules have been softened.

Figure 6:
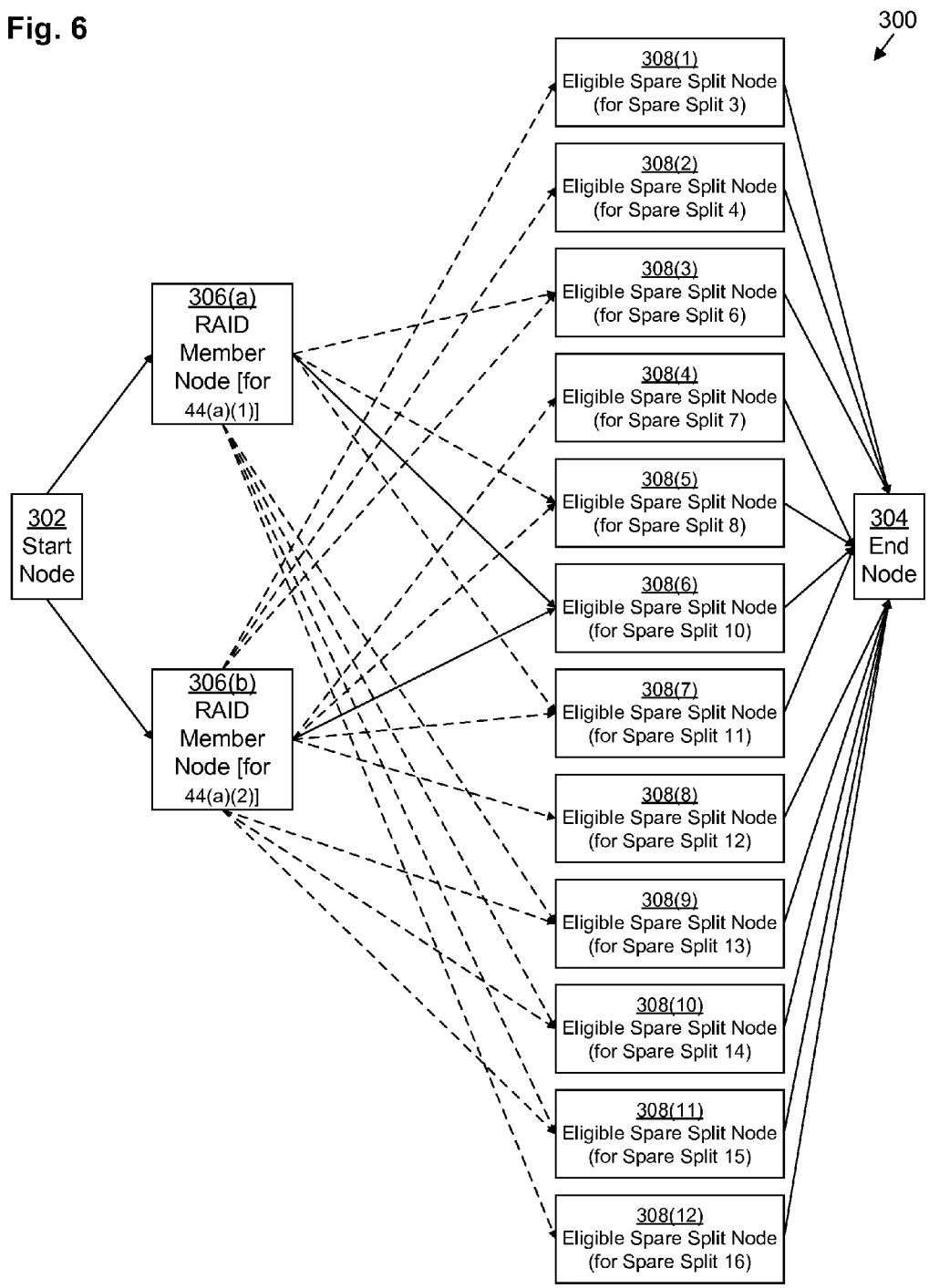
FIG. 6 is a directed graph for use in connection with various embodiments.

In FIG. 6, it should be understood that the solid edges from the RAID member nodes 306 to the eligible spare split nodes 308 represent edges that are initially available in a first iteration, while the dotted edges from the RAID member nodes 306 to the eligible spare split nodes 308 represent edges that only become available after rule softening occurs.

For example, directed graph 300 may represent a scenario in which disk 42(a) of RAID cluster 43 using RAID 5 fails and the following rules (as depicted in Table 1, excluding the "Min write spread" rule) are used: "Leave empty," "# Splits per drive fixed," "Short stroking," "Max read spread," "Max read collision," "RG members per disk," and "RG members per power zone." Initially, before any of the rules are hardened, the "RG members per power zone" excludes any spare splits from power zones 46(2), 46(3), and 46(4), leaving only spare splits 44(i)(9) and 44(i)(10). However, because spare split 44(i)(9) is reserved, the "Leave empty" rule also excludes that spare split 44(i)(9), leaving spare split 44(i)(10) as the only eligible spare split for either the member of RAID group RG 1 initially stored on split 44(a)(1) or the member of RAID group RG 5 initially stored on split 44(a)(2). Thus, solid edges, representing the initial eligible paths, are only depicted from RAID member node 306(a) to eligible spare split node 308(6) and from RAID member node 306(b) to eligible spare split node 308(6). However, since there are two RAID member nodes 306(a), 306(b) but only one eligible spare split node 308(6), this initial iteration will fail. Therefore, rule softening will occur. However, even upon softening the rules of softening hierarchy groups 1-3, no additional edges are added. But, upon softening the rule ("RG members per power zone") of softening hierarchy group 4, many additional edges are added, depicted as dotted lines in directed graph 300.

Thus, techniques for selecting a proper set of spare splits to use in a given failure scenario have been provided. These embodiments use a set of spare selection rules 38 to define which spare splits are eligible to serve as spares for reconstruction of the RAID members on a disk 42 that had failed. In addition, the set of rules 38 may include weighted rules to allow optimization in the spare selection process.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method, performed by a data storage device, of recovering from a failure of a disk within a declustered RAID arrangement, the declustered RAID arrangement including N disks, each disk having a plurality of splits, the declustered RAID arrangement having a plurality of RAID groups, each RAID group distributed over a plurality less than N of members on distinct splits on distinct disks of the N disks, N being an integer greater than one, the method comprising:
    receiving an indication that the disk has failed, the failed disk storing a set of members of various RAID groups of the plurality of RAID groups;
    identifying, with reference to a set of hard rules, a set of spare splits eligible to store reconstructed versions of the set of members, each spare split being a split which is currently not a member of any RAID group, resulting in a set of eligible members of the set of members being identified as eligible sources for each respective spare split of the set of spare splits;

searching for an assignment between each member of the set of members and a respective eligible spare split of the set of spare splits; and upon finding an assignment, reconstructing each member of the various RAID groups stored on the failed disk onto its respective assigned spare split;

wherein searching for the assignment includes applying a set of weighted rules to generate a weighted score for each pair of one spare split and one of its respective eligible sources.

2. The method of claim 1 wherein searching for the assignment further includes:

for each member of the set of members, ranking, with reference to the weighted scores, all spare splits for which that member is an eligible source; and recursively searching for the assignment by attempting to assign higher-ranking spare splits to each respective member of the set of members prior to attempting to assign lower-ranking spare splits to each respective member.

3. The method of claim 1 wherein searching for the assignment further includes:

converting the generated weighted scores to flow capacity scores;

generating a directed graph with nodes representing respective members of the set of members and the eligible spare splits, the directed graph including an edge from each node representing a member of the set of members to respective nodes representing eligible spare splits for which that member is an eligible source, each edge having a flow capacity defined by a respective converted flow capacity score; and applying a flow maximization technique to the directed graph.

4. The method of claim 3 wherein:

converting the generated weighted scores to flow capacity scores includes:

inverting the generated weighted scores;

normalizing the inverted weighted scores to a lowest value of the inverted weighted scores; and performing integer rounding on the normalized inverted weighted scores; and applying the flow maximization technique includes applying the Edmonds-Karp technique.

5. The method of claim 3 wherein:

converting the generated weighted scores to flow capacity scores includes inverting the generated weighted scores; and applying the flow maximization technique includes applying the Ford-Fulkerson technique.

6. The method of claim 1 wherein searching for the assignment further includes selecting between members of a set of search techniques based on available time and processing resources, the set of search techniques including:

a recursive search technique;

a flow maximization technique utilizing integer flow capacity values in a directed graph; and a flow maximization technique utilizing non-integer flow capacity values in a directed graph.

7. A method, performed by a data storage device, of recovering from a failure of a disk within a declustered RAID arrangement, the declustered RAID arrangement including N disks, each disk having a plurality of splits, the declustered RAID arrangement having a plurality of RAID groups, each RAID group distributed over a plurality less than N of members on distinct splits on distinct disks of the N disks, N being an integer greater than one, the method comprising:

receiving an indication that the disk has failed, the failed disk storing a set of members of various RAID groups of the plurality of RAID groups;

identifying, with reference to a set of hard rules, a set of spare splits eligible to store reconstructed versions of the set of members, each spare split being a split which is currently not a member of any RAID group, resulting in a set of eligible members of the set of members being identified as eligible sources for each respective spare split of the set of spare splits;

searching for an assignment between each member of the set of members and a respective eligible spare split of the set of spare splits; and upon finding an assignment, reconstructing each member of the various RAID groups stored on the failed disk onto its respective assigned spare split;

wherein searching for the assignment includes:

generating a directed graph with nodes representing respective members of the set of members and the eligible spare splits, the directed graph including an edge from each node representing a member of the set of members to respective nodes representing eligible spare splits for which that member is an eligible source, each edge having an equal integer flow capacity; and applying the Edmonds-Karp technique to the directed graph.

8. A method, performed by a data storage device, of recovering from a failure of a disk within a declustered RAID arrangement, the declustered RAID arrangement including N disks, each disk having a plurality of splits, the declustered RAID arrangement having a plurality of RAID groups, each RAID group distributed over a plurality less than N of members on distinct splits on distinct disks of the N disks, N being an integer greater than one, the method comprising:

receiving an indication that the disk has failed, the failed disk storing a set of members of various RAID groups of the plurality of RAID groups;

identifying, with reference to a set of hard rules, a set of spare splits eligible to store reconstructed versions of the set of members, each spare split being a split which is currently not a member of any RAID group, resulting in a set of eligible members of the set of members being identified as eligible sources for each respective spare split of the set of spare splits;

searching for an assignment between each member of the set of members and a respective eligible spare split of the set of spare splits;

upon finding an assignment, reconstructing each member of the various RAID groups stored on the failed disk onto its respective assigned spare split; and upon not finding an assignment:

softening one or more hard rules of the set of hard rules by removing a limit from each of the one or more hard rules, forming a softened set of hard rules;

re-identifying, with reference to the softened set of hard rules, a new set of spare splits eligible to store reconstructed versions of the set of members, each new spare split being a split which is currently not a member of any RAID group, resulting in a new set of eligible members of the set of members being identified as now eligible sources for each respective new spare split of the set of spare splits; and re-searching for an assignment between each member of the set of members and a respective eligible spare split of the new set of spare splits.

9. The method of claim 8 wherein softening the one or more hard rules of the set of hard rules includes softening the one or more hard rules of the set of hard rules in order of a pre-defined hierarchy.

10. The method of claim 8 wherein re-searching for the assignment includes applying a set of weighted rules to generate a weighted score for each pair of one new spare split and one of its respective now eligible sources.

11. The method of claim 10 wherein re-searching for the assignment further includes:
for each member of the set of members, ranking, with reference to the weighted scores, all new spare splits for which that member is a now eligible source; and
recursively searching for the assignment by attempting to assign higher-ranking new spare splits to each respective member of the set of members prior to attempting to assign lower-ranking new spare splits to each respective member.

12. The method of claim 10 wherein re-searching for the assignment further includes:
converting the generated weighted scores to flow capacity scores;
generating a directed graph with nodes representing respective members of the set of members and the eligible new spare splits, the directed graph including an edge from each node representing a member of the set of members to respective nodes representing eligible new spare splits for which that member is a now eligible source, each edge having a flow capacity defined by a respective converted flow capacity score; and
applying a flow maximization technique to the directed graph.

13. The method of claim 12 wherein:
converting the generated weighted scores to flow capacity scores includes:
inverting the generated weighted scores;
normalizing the inverted weighted scores to a lowest value of the inverted weighted scores; and
performing integer rounding on the normalized inverted weighted scores; and
applying the flow maximization technique includes applying the Edmonds-Karp technique.

14. The method of claim 12 wherein:
converting the generated weighted scores to flow capacity scores includes inverting the generated weighted scores; and
applying the flow maximization technique includes applying the Ford-Fulkerson technique.

15. The method of claim 10 wherein re-searching for the assignment further includes selecting between members of a set of search techniques based on available time and processing resources, the set of search techniques including:
a recursive search technique;
a flow maximization technique utilizing integer flow capacity values in a directed graph; and
a flow maximization technique utilizing non-integer flow capacity values in a directed graph.

16. The method of claim 8 wherein re-searching for the assignment includes
generating a directed graph with nodes representing respective members of the set of members and the eligible new spare splits, the directed graph including an edge from each node representing a member of the set of members to respective nodes representing eligible new spare splits for which that member is a now eligible source, each edge having an equal integer flow capacity; and
applying the Edmonds-Karp technique to the directed graph.

17. An apparatus comprising:
storage interface circuitry configured to provide access to a set of N disks in a declustered RAID arrangement, each disk having a plurality of splits, the declustered RAID arrangement having a plurality of RAID groups, each RAID group distributed over a plurality less than N of members on distinct splits on distinct disks of the N disks, N being an integer greater than one;
processing circuitry coupled to memory and to the storage interface circuitry, the processing circuitry being configured to recover from a failure of a disk of the declustered RAID arrangement by:
receiving an indication that the disk has failed, the failed disk storing a set of members of various RAID groups of the plurality of RAID groups;
identifying, with reference to a set of hard rules, a set of spare splits eligible to store reconstructed versions of the set of members, each spare split being a split which is currently not a member of any RAID group, resulting in a set of eligible members of the set of members being identified as eligible sources for each respective spare split of the set of spare splits;
searching for an assignment between each member of the set of members and a respective eligible spare split of the set of spare splits;
upon finding an assignment, reconstructing each member of the various RAID groups stored on the failed disk onto its respective assigned spare split; and
upon not finding an assignment:
softening one or more hard rules of the set of hard rules by removing a limit from each of the one or more hard rules, forming a softened set of hard rules;
re-identifying, with reference to the softened set of hard rules, a new set of spare splits eligible to store reconstructed versions of the set of members, each new spare split being a split which is currently not a member of any RAID group, resulting in a new set of eligible members of the set of members being identified as now eligible sources for each respective new spare split of the set of spare splits; and
re-searching for an assignment between each member of the set of members and a respective eligible spare split of the new set of spare splits.

18. A computer program product comprising a non-transitory computer-readable storage medium storing a set of instructions, which, when performed by a data storage device, cause the data storage device to recover from a failure of a disk within a declustered RAID arrangement, the declustered RAID arrangement including N disks, each disk having a plurality of splits, the declustered RAID arrangement having a plurality of RAID groups, each RAID group distributed over a plurality less than N of members on distinct splits on distinct disks of the N disks, N being an integer greater than one, the recovery being performed by:
receiving an indication that the disk has failed, the failed disk storing a set of members of various RAID groups of the plurality of RAID groups;
identifying, with reference to a set of hard rules, a set of spare splits eligible to store reconstructed versions of the set of members, each spare split being a split which is currently not a member of any RAID group, resulting in a set of eligible members of the set of members being identified as eligible sources for each respective spare split of the set of spare splits;

searching for an assignment between each member of the set of members and a respective eligible spare split of the set of spare splits; and upon finding an assignment, reconstructing each member of the various RAID groups stored on the failed disk onto its respective assigned spare split;

wherein searching for the assignment includes applying a set of weighted rules to generate a weighted score for each pair of one spare split and one of its respective eligible sources.

* * * * *